(12) United States Patent
Masters et al.

(10) Patent No.: US 11,924,115 B2
(45) Date of Patent: Mar. 5, 2024

(54) SYSTEMS AND METHODS FOR USE IN BALANCING NETWORK RESOURCES

(71) Applicant: IPCO 2012 LIMITED, London (GB)

(72) Inventors: Neil Masters, West Yorkshire (GB); Amitabha Datta, Buckinghamshire (GB)

(73) Assignee: IPCO 2012 LIMITED, London (GB)

( * ) Notice: Subject to any disclaimer, the term of this patent is extended or adjusted under 35 U.S.C. 154(b) by 0 days.

(21) Appl. No.: 17/749,489

(22) Filed: May 20, 2022

(65) Prior Publication Data
US 2023/0379265 A1    Nov. 23, 2023

(51) Int. Cl.
*H04L 47/72* (2022.01)
(52) U.S. Cl.
CPC ..................... *H04L 47/72* (2013.01)
(58) Field of Classification Search
CPC ........................................................ H04L 47/72
See application file for complete search history.

(56) References Cited

U.S. PATENT DOCUMENTS

| | | | |
|---|---|---|---|
| 8,255,407 B1 * | 8/2012 | Graupner ............... | G06F 9/5061 707/758 |
| 9,929,971 B2 * | 3/2018 | Ward, Jr. .............. | G06F 9/5044 |
| 2017/0046204 A1 * | 2/2017 | Li ......................... | G06F 9/5061 |
| 2018/0060132 A1 * | 3/2018 | Maru .................... | G06F 16/248 |
| 2022/0012105 A1 * | 1/2022 | Chagam Reddy .... | G06F 9/5044 |
| 2022/0053344 A1 * | 2/2022 | Vandikas .............. | H04W 24/04 |
| 2022/0138015 A1 * | 5/2022 | Verma ................... | G06F 9/5072 709/226 |

OTHER PUBLICATIONS

U.S. Appl. No. 10/552,221, filed Feb. 4, 2020, Olshefski et al.

* cited by examiner

*Primary Examiner* — Glenton B Burgess
*Assistant Examiner* — Jihad K Boustany
(74) *Attorney, Agent, or Firm* — Harness, Dickey & Pierce, P.L.C.

(57) ABSTRACT

Systems and methods are provided for allocating resources between data centers in response to insufficient resources at one of the data centers. One example computer-implemented method includes determining by a first data center, in response to a request for resources, whether the resources exceed remaining resources of the first data center. In response to determining that the requested resources exceed the remaining resources of the first data center, the first data center reserves its remaining resources, appends an entry for the remaining resources to a ledger, and submits a request to a second data center to reserve a difference between the resources in the request and the remaining resources of the first data center. Then, in response to a time interval expiring without the reserved remaining resources being utilized, the reserved remaining resources identified in the entry in the ledger are refunded to the first data center.

13 Claims, 3 Drawing Sheets

SYSTEMS AND METHODS FOR USE IN BALANCING NETWORK RESOURCES

FIELD

The present disclosure generally relates to systems and methods for use in balancing and/or allocating network resources and, in particular, to systems and methods for use in balancing and/or allocating network resources between data centers to accommodate resource demands in excess of resources allocated to one of the data centers.

BACKGROUND

This section provides background information related to the present disclosure which is not necessarily prior art.

It is known for network resources to be consumed through different network activities, such as, for example, transactions. Where a network resource includes a budget, or a limit, for a given cycle, and where the budget (or limit) is assigned to a participant, the transactions associated with the participant are applied to the budget during the cycle to ensure that the participant is permitted to complete the transactions. In this manner, a network providing the budget resource to the participant is protected from transactions beyond the budget.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Resource allocation to participants may be employed as a mechanism for limiting exposure of a processing network, whereby each participant is limited to the allocated resources per cycle. In various embodiments, the processing network may include multiple processing points, or data centers, whereby the resources for a participant are divided between the data centers. In such embodiments, remaining resources for the participant may be balanced, from time to time, during the cycle. That said, a transaction may require more resources than available at one of the data centers, whereby the transaction is declined despite the existence of resources for that participant being available at another one (or more) of the date centers.

Uniquely, the systems and methods herein provide for use of resources at multiple data centers, for a transaction in excess of the resources at a one of the data centers processing the transaction. In particular, for a given transaction in excess of a resource, a data center reserves the remaining resources, and then submits a request for the balance of the resources necessary for the transaction to another data center. As such, the data center(s) reserves the resources necessary for the transaction. In reserving the resources, each data center updates a running total of the resources and appends an entry indicative of the reserved resources to a ledger included therein. If the entry is not cleared from the ledger within an interval, or based on another trigger event, the data center(s) delete the entries and adjust the running total according. In this manner, resources are enabled for use across multiple data centers, yet protected from extended reservation beyond an interval in which the transaction causing the reservation is completed.

Figure 1:
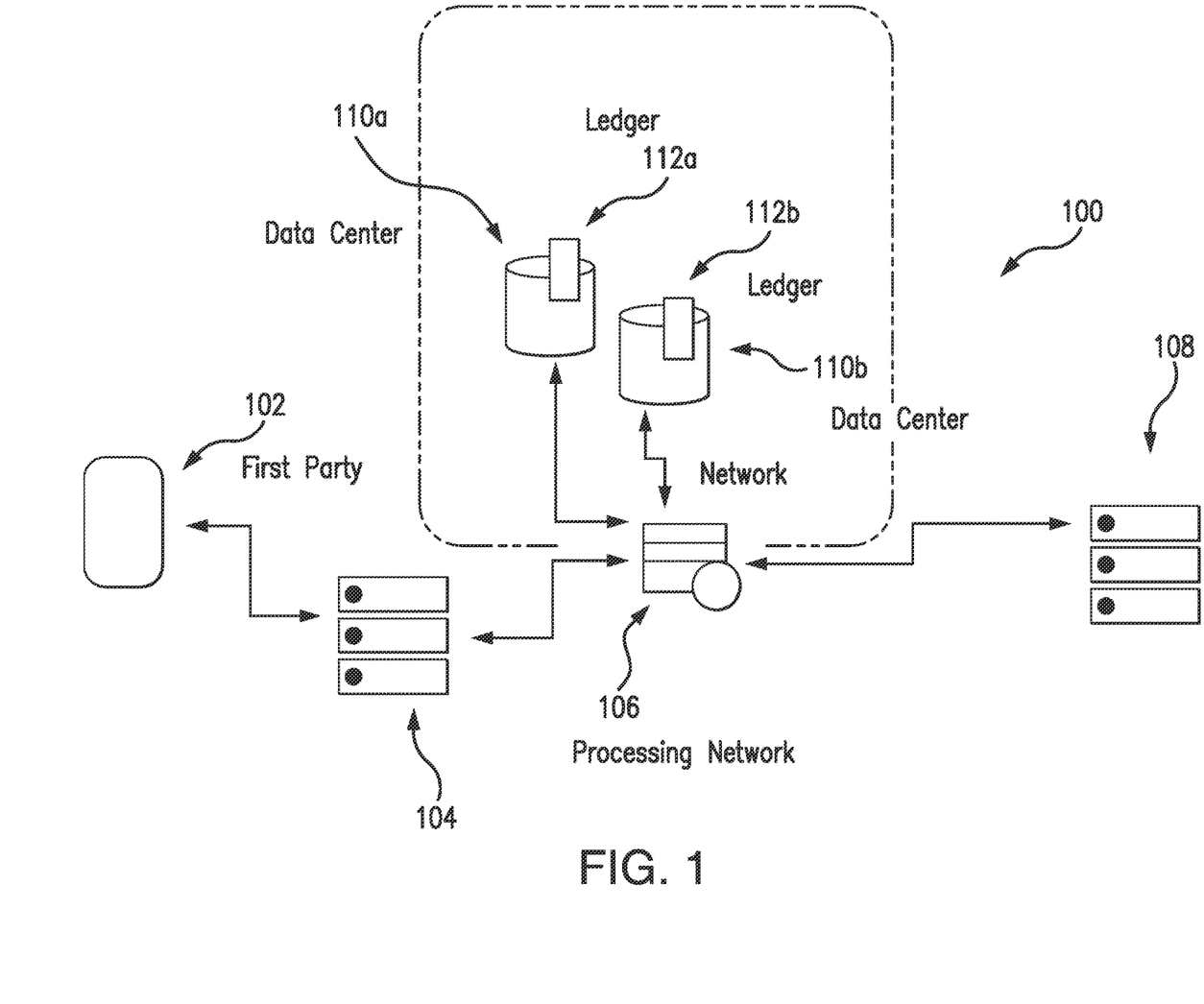
FIG. 1 illustrates an example system for use in refunding reserved resources to data centers for uncompleted transactions.

FIG. 1 illustrates an example system 100 in which one or more aspects of the present disclosure may be implemented. Although parts of the system 100 are presented in one arrangement, it should be appreciated that other example embodiments may include the same or different parts arranged otherwise depending on, for example, types of transactions and/or participants, privacy concerns and/or regulations, etc.

As shown in FIG. 1, the illustrated system 100 generally includes a first party 102, an acquirer 104, a processing network 106, and an issuer 108 of accounts, each coupled to (and each in communication with) one or more networks, as indicted by the arrowed lines. Each of the one or more networks may include, without limitation, a wired and/or wireless network, a local area network (LAN), a wide area network (WAN) (e.g., the Internet, etc.), a mobile network, and/or another suitable public and/or private network capable of supporting communication among two or more of the illustrated components of the system 100, or any combination thereof. One or more of the networks may further be segregated or separated, whereby, for example, the segregated or separated network(s) may include a private network provided by the processing network 106 to the acquirer 104 and the issuer 108, and separately, a public network (e.g., the Internet, etc.) through which the first party 102 and a user (e.g., a communication device associated therewith) may communicate (e.g., in connection with an interaction or transaction therebetween, etc.), or through which the first party 102 may communicate with the acquirer 104, the processing network 106, and/or the issuer 108, etc. with regard to processing a transaction, etc.

In this example embodiment, the first party 102 is associated with one or more products, or services, which are offered for sale to various users. As such, the first party 102 may include a virtual merchant (e.g., a website, network application, etc.), a physically located merchant, etc. That said, the first party 102 may include any party that participates in one or more transactions, through the processing network 106, etc.

With continued reference to FIG. 1, the acquirer 104 may include a bank or other financial institution, which is configured to issue an account to the first party 102. The account is the destination for funds paid to the first party 102, for example, via payment account transactions, etc. Similarly, the issuer 108 is a bank or other financial institution, which is configured to issue accounts (e.g., credit accounts, debit accounts, prepaid accounts, etc.) to one or more users (e.g., persons, businesses, etc.), etc. As described herein, the accounts are the source of the funds paid to the first party 102, for example, via transactions performed by one or more users at the first party 102 to purchase one or more products/services. It should be appreciated that the acquirer 104 may be considered an issuer in some transactions, where the account issued by the acquirer 104 is the sources of the funds, and likewise, the issuer 108 may be considered an acquirer in some transactions, where the account issued by the issuer 108 is the destination of the funds.

Accordingly, each of the acquirer 104 and the issuer 108 may be considered participants, as it relates to the processing network 106, as each participates in transactions herewith (with users).

The processing network 106 is coupled in communication between the acquirer 104 and the issuer 108, via the one or more networks, and is configured to provide for communication therebetween, for purposes of authorization, clearing and settlement of transactions therebetween, etc. (broadly, for processing transactions). The transactions (as well as other transactions in the system 100) are generally, in FIG. 1, facilitated through an authorization request, generated by the first party 102 and communicated, for example, through the acquirer 104 and the processing network 106, to the issuer 108, and through an authorization reply generated by the issuer 108 and communicated back to the first party 102, as described below. The authorization request and the authorization reply generally abide by the ISO 8583 standard in this example embodiment. Further, the processing network 106 is configured, in connection with the above, to compile and store transaction data for interactions coordinated therethrough. The transaction data may include, without limitation, account numbers, user identifiers, first party identifiers (e.g., merchant ID, etc.), acquirer identifiers, first party category codes (e.g., merchant category codes (MCCs), etc.), location data, time/date, amounts, etc.

While only one first party 102, one acquirer 104, one processing network 106, and one issuer 108 are shown in FIG. 1, it should be appreciated that additional instances of these entities or other entities may be included in other system embodiments.

Figure 2:
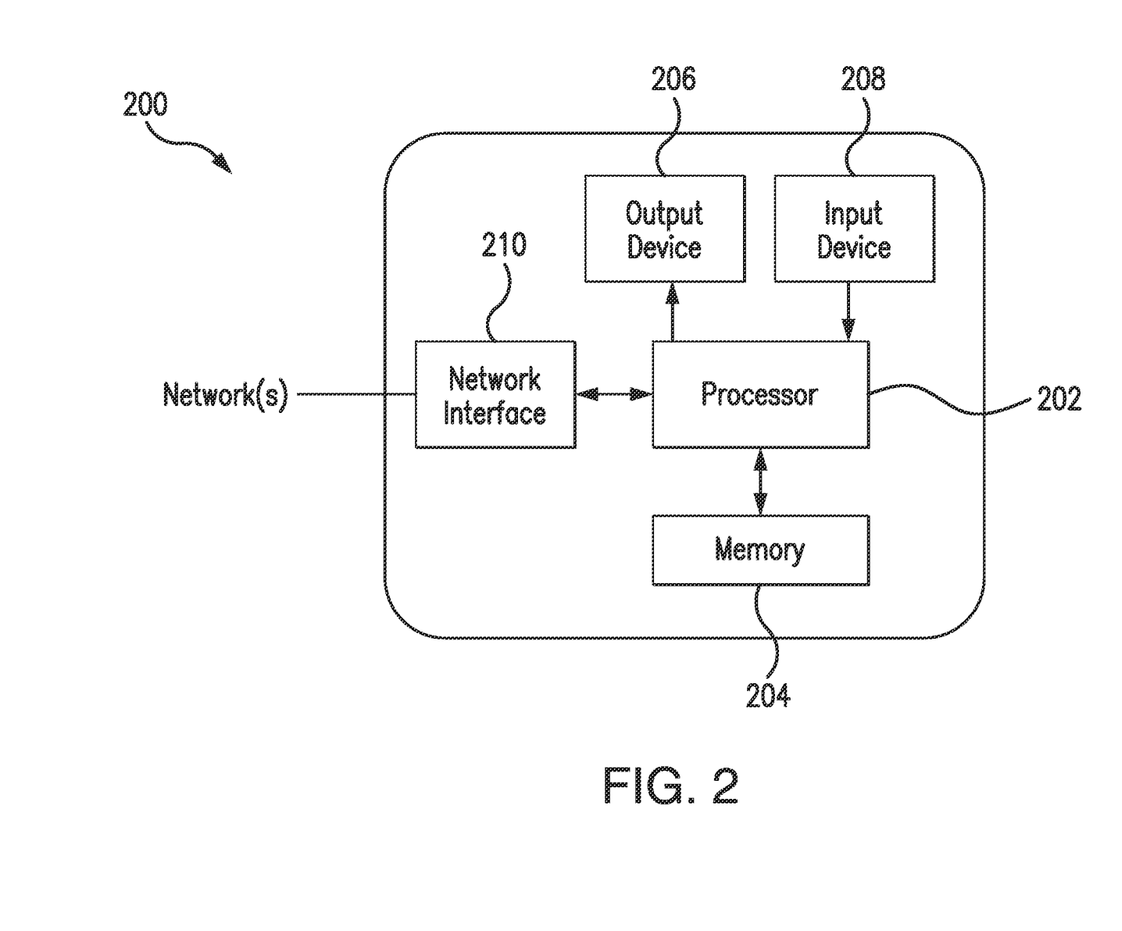
FIG. 2 is a block diagram of an example computing device that may be used in the system of FIG. 1.

FIG. 2 illustrates an example computing device 200 that can be used in the system 100. The computing device 200 may include, for example, one or more servers, workstations, personal computers, laptops, tablets, smartphones, etc. In addition, the computing device 200 may include a single computing device, or it may include multiple computing devices located in close proximity, or multiple computing devices distributed over a geographic region, so long as the computing devices are specifically configured to function as described herein. In at least one embodiment, the computing device 200 is accessed (for use as described herein) as a cloud, fog and/or mist type computing device. In the system 100, the first party 102, the acquirer 104, the processing network 106, and the issuer 108, as well as data centers 110a-b and ledgers 112a-b, may each include and/or be considered one or more computing devices, which may include or be consistent, in whole or in part, with the computing device 200. With that said, the system 100 should not be considered to be limited to the computing device 200, as described below, as different computing devices and/or arrangements of computing devices may be used. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permits data, instructions, etc., to be stored therein and retrieved therefrom. The memory 204 may include one or more computer-readable storage media, such as, without limitation, dynamic random-access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, ledger entries, resource running totals, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein (e.g., one or more of the operations recited in the methods herein, etc.), such that the memory 204 is a physical, tangible, and non-transitory computer readable storage media. Such instructions often improve the efficiencies and/or performance of the processor 202 and/or other computer system components configured to perform one or more of the various operations herein, whereby upon executing such instructions the computing device 200 operates as (or transforms into) a specific-purpose device configured to then effect the features described herein. It should be appreciated that the memory 204 may include a variety of different memories, each implemented in one or more of the functions or processes described herein.

In the example embodiment, the computing device 200 also includes an output device 206 that is coupled to (and that is in communication with) the processor 202. The output device 206 outputs information, audibly or visually, for example, to a user associated with any of the entities illustrated in FIG. 1, at a respective computing device, etc. The output device 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) from users in the system 100, etc. The input device 208 may include a single input device or multiple input devices. The input device 208 is coupled to (and is in communication with) the processor 202 and may include, for example, one or more of: a keyboard, a pointing device, a mouse, a touch sensitive panel (e.g., a touch pad or a touch screen, etc.), another computing device, and/or an audio input device. Further, in various example embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating through the one or more networks, and generally, with one or more other computing devices, etc.

Referring again to the example embodiment of FIG. 1, the processing network 106 includes (as indicated by the dotted box) two data centers 110a-b, which are disposed at geographically distinct locations.

In particular, the data centers 110a-b may be located in different regions of a single country, or different countries around the world, etc. And, the data centers 110a-b are generally configured as redundant of one another, whereby each is configured to perform the same or similar operations as part of the processing network 106. Specifically, for example, the data centers 110a-b are each configured to received authorization requests for transactions from the acquirer 104, to perform one or more operations related to the transactions (e.g., scoring, etc.), and then to pass the authorization requests to the issuer 108, whereby the issuer 108 is configured to approve or decline the transaction and to compile and transmit authorization replies to the processing network 106. The processing network 106 (e.g., the data centers 110a-b, etc.) is/are configured to receive the authorization replies, to (optionally) perform one or more operations related to the transactions, and to return the authorization replies to the acquirer 104.

In connection therewith, transactions are generally divided between the data centers 110a-b. For example, transactions may be routed to one data centers 110a based on ranges of data included in the authorization requests (e.g., certain ranges of primary account numbers (PANs), transaction identifiers, location data, merchant data, etc.), and to the other data center 110b based on alternate ranges of the data (e.g., different ranges of PANs, transaction identifiers, location data, merchant data, etc.). Additionally, or alternatively, one or more other load balancing techniques may be employed to divide transactions between the data centers 110a-b.

As further shown in the embodiment of FIG. 1, the data center 110a includes ledger 112a, and the data center 110b includes ledger 112b. The ledgers 112a-b each generally include a data structure, such as, for example, a table, etc., to which entries associated with reserved resources associated with the data centers 110a-b may be appended (or added or recorded), and then cleared (e.g., removed, deleted, etc.), as desired and/or required, etc.

In this example embodiment, the processing network 106 is configured to allocate resources to each of the participants associated with the processing network 106 (e.g., the acquirer 104, the issuer 108, etc.). The resources may include a budget, or a limit, in dollars (or other currency) or as a count, associated with transactions, per cycle (e.g., hour, hours, day, days, etc.) for the given participant. For example, the issuer 108 (or participant 108 herein) may be allocated a budget of $100,000 per day (e.g., between midnight and midnight, etc.) to be utilized for transactions. The resources are further associated with a running total, or a settlement risk position (SRP), which is a total of the credit and debits to the participant 108 within the cycle. For example, where a debit transaction for $1000 is processed to the participant 108, the processing network 106 is configured to reduce the resources for the participant 108 to $99,000, and further configured to increase the resources to $99,300 upon a credit transaction of $300 (immediately after the $1000 debit) to the participant 108. In general, the processing network 106, and more specifically, the data centers 110-b are configured to permit transactions, for example, based on the transactions being within the resources associated with the given participant.

In allocating resources to participants, and given the division of transactions between the data centers 110a-b, the resources are generally allocated between the two data centers 110a-b. For example, for an allocation of $100,000 to the participant 108, resources of $50,000 may be allocated to the data center 110a, and resources of $50,000 may be allocated to the data center 110b. The data centers 110a-b may be configured to allocate the resources evenly, or not, and further to balance the remaining resources from time to time during the cycle (according to one or more allocations (e.g., balanced, percentage, etc.), according to one or more predetermined time frames (e.g., as predefined, set rebalancing intervals, etc.) for rebalancing, etc.).

Despite the balancing, from time to time, the resources at one data center 110a, for example, may be depleted while resources remain at the data center 110b. In this example embodiment, however, each of the data centers 110a-b is configured to coordinate reservation of resources with the other data center to accommodate transactions in excess of resources available in the data center to which the transaction is received (without having to wait for a given rebalancing interval, etc.). In particular, the data center 110a, for example, is configured to determine, when applicable, that a transaction associated with a participant exceeds the remaining resources for the data center 110a (for the participant). In turn, the data center 110a is configured to then reserve the remaining resources (or needed resources), to append a reserve entry to the ledger 112a (broadly, data structure), and to solicit resources (to cover the balance of the transaction) from the other data center 110b. The data center 110b, in turn, is configured to determine whether sufficient resources remain in the data center 110b to cover the remainder or balance of the transaction. If so, the data center 110b is configured to reserve the remaining resources to cover the transaction, to append a reserve entry to the ledger 112b, and to return a result, i.e., a successful result, to the resource reservation to the data center 110a. The data center 110a is then configured to continue in processing and/or completing the transaction.

If there is insufficient remaining resources in the data center 110b, however, the data center 110b is configured to return a result, i.e., a failed result, to the data center 110a. In doing, so, the transaction may then fail to complete due to the lack of resources (or, the data center 110a may look to one or more other data centers of the processing network 106 for available resources for the participant).

As part of the above, whether based on a communication between the data centers 110a-b, or a timeout for a given transaction, the resources may be reserved in one or both of the data centers 110a-b for a transaction, yet the transaction fails to complete. In this manner, the resource running total(s) in one or both of the data centers 110a-b is incorrect. In connection therewith, in this example embodiment, each of the data centers 110a-b is configured to monitor the ledgers 112a-b to detect entries, which are uncompleted and pending for more than a threshold amount of time, i.e., stale reserve entries. For example, where a reserve entry included in the ledger 112b is incomplete for more than about ten seconds, more than about thirty seconds, more than about sixty seconds, more than about one hundred seconds, or more than two minutes, etc., the reserve entry is designated for refund. The data center 110b is configured, in turn, to delete the reserve entry from the ledger 112b, to refund the reserve resources and to update the running total to reflect the refund of the resources. In addition, that data center 110b may further be configured to notify the data center 110a of the refund. As originally stored, the reserve entry in the ledger 112*b* may include a transaction ID or other unique identifier (for the transaction, date/time, etc.), whereby the notification to the data center 110*a* may also include the transaction ID or unique identifier, thereby enabling the data center 110*a* to link the refund to a complete or incomplete transaction associated with the data center 110*a* (and to refund resources, as necessary).

In this manner, transactions are permitted to utilize resources from different data centers, yet the data centers are protected from reserved, but unused, resources through refunding the resources to the respective data centers based on one or more conditions (e.g., time intervals, stale reserve entries, incomplete transaction notices, etc.).

Figure 3:
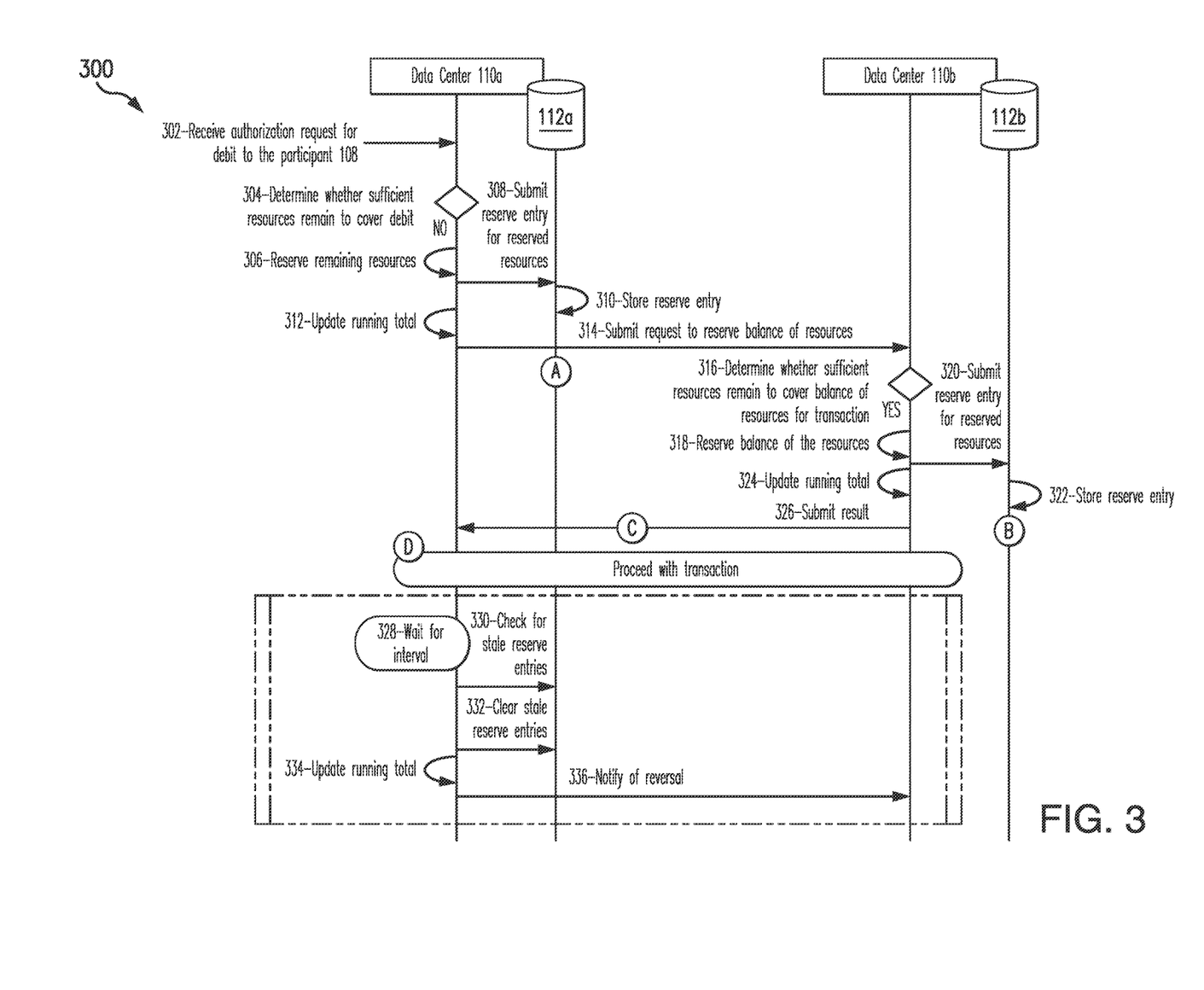
FIG. 3 illustrates an example method that may be implemented via the system of FIG. 1, for use in refunding reserve resources to a data center, which reserved the resources, in response to an incomplete transaction to which the reserved resources are reserved.

FIG. 3 illustrates an example method 300 for use in balancing network resources. The example method 300 is described (with reference to FIG. 1) as generally implemented in the data centers 110*a-b* and other parts of the system 100, and with further reference to the computing device 200. As should be appreciated, however, the methods herein should not be understood to be limited to the example system 100 or the example computing device 200, and the systems and the computing devices herein should not be understood to be limited to the example method 300.

At the outset in this example, it should be appreciated that the participant 108 (e.g., issuer 108, etc.) is allocated certain resources, which provide for a $50,000 budget, per cycle (e.g., day, etc.), whereby the issuer 108 is permitted to incur up to $50,000 in debits for each day, through the processing network 106. The resources are allocated evenly between the data center 110*a* and the data center 110*b*, and a running total is maintained where the allocated resources are reduced by debits to the participant 108 and increased by credits to the participant 108. Further in this example, the resources in each of the data centers 110*a-b* have been reduced, through debits, down to $1000 remaining in the data center 110*a* and $10,700 remaining in the data center 110*b*. It should be appreciated that the specific resources are provided for purposes of illustration and any type and/or number (or amount) of resources may be employed in other embodiments.

Based on the above, and prior to any rebalancing between the data centers 110*a-b*, an authorization request for a debit of resources for the participant 108 is received at the data center 110*a*, at 302, from the acquirer 104, in the amount of $1500, for example.

Thereafter, at 304, the data center 110*a* determines whether sufficient resources remain for the participant 108, during the current cycle, to cover the debit of resources. As noted above, the remaining resources at the data center 110*a* are $1000. As such, the data center 110*a* does not have sufficient resources to cover the debit. As shown in FIG. 3, the data center 110*a* therefore reserves its currently remaining resources, at 306, in the amount of $1000 in this example, for the transaction, and submits, at 308, a reserve entry for the transaction to the ledger 112*a*. The reserve entry may include, without limitation, the amount of the reserve (i.e., $1000, in this example), a transaction identifier (e.g., a transaction ID for the transaction associated with the received authorization request, etc.), a time/date, a state of (or for) the transaction (e.g., a status of the transaction such as "completed" or "pending" or "failed" or "N/A" or "refunded", etc.), a settlement cycle in which the transaction was processed (e.g., such that funds are not returned to a subsequent cycle if refunded, etc.), etc. The ledger 112*a* stores, at 310, the reserve entry.

Consistent with reserving the resources, the data center 110*a* updates, at 312, the running total of resources for the data center 110*a* (for the participant 108), thereby, in this example, reducing the resources to zero for the participant 108.

With continued reference to FIG. 3, the data center 110*a* then submits, at 314, a request to the data center 110*b* (and, in some examples, to one or more other data centers of the processing network 106 that have resources allocated for the participant 108, etc.), to reserve a balance of the resources needed to cover the debit for the transaction. In turn, at 316, the data center 110*b* determines whether sufficient resources remain for the participant 108, during the current cycle, to cover the debit of resources. As noted above, because the remaining resources are $10,700 at the data center 110*b*, the data center 110*b* does have sufficient resources to cover the debit. As such, the data center 110*b* reserves the remaining resources, at 318, in the amount of $500 for the transaction, and submits, at 320, a reserve entry for the transaction to the ledger 112*b*. The reserve entry may include, without limitation, the amount of the reserve (i.e., $500, in this example), a transaction identifier (e.g., a transaction ID for the transaction associated with the request, etc.), a time/date, a state of (or for) the transaction (e.g., a status of the transaction such as "completed" or "pending" or "failed" or "N/A" or "refunded", etc.), a settlement cycle in which the transaction was processed (e.g., such that funds are not returned to a subsequent cycle, etc.), etc. The ledger 112*b* stores, at 322, the reserve entry.

Consistent with reserving the resources, the data center 110*b* updates, at 324, the running total of resources for the data center 110*b*, thereby, in this example, reducing the resources to $10,200 in this example. The data center 110*b* further submits a result to the data center 110*a*, indicating a successful reservation of the balance of the resources for the transaction, in this example. If, however, at 316, the data center 110*b* determines that there is insufficient resources to cover the balance of the debit, the result submitted, by the data center 110*b*, at 324, would be indicative of a failed reservation of the balance of the resources for the transaction.

Next in method 300, because the result is successful, in this example, the data center 110*a* proceeds in the transaction, whereby the data center 110*a* performs any needed services for the transaction, and the authorization request is then submitted, by the data center 110*a* (and the processing network 106, more generally), to the participant 108 for approval. When approved (and not declined), the participant 108 responds with an authorization reply indicating the transaction is approved. The authorization reply is passed back to the acquirer 104, whereby the transaction is completed. The data center 110*a* may then remove (or clear) the reserved resource entry for the completed transaction from the ledger 112*a*. In addition, the data center 110*a* may notify the data center 110*b* that the transaction is complete, whereby the data center 110*b* may also remove (or clear) the reserved resource entry for the completed transaction from the ledger 112*b* (e.g., based on the transaction ID for the transaction, etc.). In addition, the data centers 110*a-b* may also remove (or clear) any related entries tagged with a cycle relating to the completed transaction, etc. (e.g., to maintain the ledgers 112*a-b* at manageable sizes, etc.).

As part of the method 300, it is possible, from time to time, that the transaction fails, for example, due to a communication error between the data centers 110*a-b*, or a timeout of the transaction, or other reason (e.g., a functional error in processing the transaction, failure of a server at which the transaction is being processed, a software failure, etc.), etc., whereby the transaction is not completed. Method 300 includes designators A, B, C, and D as potential points at which the transaction may fail or otherwise not be completed. As apparent in method 300, then, the reserve resources remain reserved and are not cleared, as the transaction is not completed. And, in such instances (regardless of how or why the transaction is not completed), the method 300 continues to operate as described herein, for example, to refund resources from the ledgers 112a-b.

The dotted box in FIG. 3 includes steps employed, in example method 300, to refund the reserved funds when appropriate (e.g., when the transaction is not completed, etc.). In particular, for the data center 110a, a wait interval is optionally imposed, at 328, to ensure the transaction is completed (or not completed). After expiration of the wait interval (or potentially, in response to a notification from the data center 110b), the data center 110a checks, at 330, the ledger 112a for the stale reserve entry, in that the reserve entry has not been cleared in the wait interval. When a stale reserve entry is included in the ledger 112a, the data center 110a clears, at 332, the stale reserve entry and then updates, at 334, the running total to refund the reserved resources. In this example, if the transaction fails or is otherwise not completed (such that the reserve entry of the $1000 in the ledger 112a is a stale reserve entry), the $1000 is refunded to the running total, making the running total $1000. In addition, in this example, the data center 110a notifies, at 336, the data center 110b of the refund, if applicable, whereby the data center 110b may also refund the reserved resources of $500 to its running total. In doing so, the deletion or clearing of the reserved resources entries in the ledgers 112a-b is performed locally at the individual data centers 110a-b, and is generally an atomic operation for the data center 110a and for the data center 110b. In other words, updating a ledger entry in the ledger 112a, for example, to indicate a refund is done generally atomically with crediting the reserved resources back to the running total for the participant 108 at the data center 110a. The same is true of the data center 110b.

Additionally, or alternatively, in response to expiration of the wait interval (or a notification from the data center 110a), the data center 110b may perform steps 330-334 (and potentially step 336) to refund the resources for the uncompleted transaction to the data center 110b. For example, after expiration of the wait interval, the data center 110b may check the ledger 112b for the stale reserve entry, in that the reserve entry has not been cleared in the wait interval. When a stale reserve entry is included in the ledger 112b, the data center 110b clears the stale reserve entry and then updates the running total to refund the reserved resources. In addition, the data center 110b may notify the data center 110a of the refund, if applicable, whereby the data center 110a may also refund the reserved resources to its running total. In doing so, again, the deletion or clearing of the reserved resources entries in the ledgers 112a-b is performed locally at the individual data centers 110a-b, and is generally an atomic operation for the data center 110a and for the data center 110b. In other words, updating a ledger entry in the ledger 112b, for example, to indicate a refund is done generally atomically with crediting the reserved resources back to the running total for the participant 108 at the data center 110b.

In some example embodiments, the data center 110a and/or the data center 110b may also (or alternatively) search their ledgers 112a-b for stale reserve entries (e.g., for specific entries in the ledgers 112a-b that are in the right state for a refund, etc.) at desired times (e.g., at set intervals, periodically, etc.). When such a stale reserve entry is identified, the data centers 110a-b may operate as described above to clear the entry and refund the reserved resources. In addition, in various embodiments, upon the data center 110a identifying such a stale entry, for example, the data center 110a may communicate with the data center 110b to determine how to post the refund (e.g., post the entire refund at the data center 110a, post the entire refund at the data center 110b, post a split refund at both data centers 110a-b based on their respective reserve entries, etc.) to help allow for appropriate resource refunding and (in some implementations) appropriate resource allocation or reallocation. In general, though, in the illustrated embodiment, only the value included in the reserve entry for a given one of the data centers 110a-b will be returned (or refunded) to that data center.

In view of the above, the systems and methods herein provide for refunding of reserved resources, when a transaction utilizing the resources fails to complete. In this manner, the systems and methods enable use of resources across multiple data centers, yet generally protect the resources from extended reservation (e.g., beyond an interval, etc.) so that the reserved resources associated with failed (or incomplete) transactions may subsequently be made available for use with future transactions as appropriate.

Again, and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) in response to a request for resources, determining, by a first data center, whether said resources exceed remaining resources of the first data center; (b) in response to determining that the requested resources exceed the remaining resources of the first data center: (1) reserving, by the first data center, the remaining resources of the first data center; (2) appending, by the first data center, a first reserve entry for the remaining resources to a first ledger of the first data center; and (3) submitting, by the first data center, to a second data center, a request to reserve a difference between the resources in the request and the remaining resources of the first data center; (c) in response to a time interval expiring without the reserved remaining resources being utilized, refunding, by the first data center, the reserved remaining resources to the first data center; (d) receiving the request for resources as an authorization request for a transaction; (e) notifying the second data center of the refund of the reserved remaining resources and/or of the time interval expiring without the reserved remaining resources being utilized; (f) appending a transaction identifier for the transaction to the first reserve entry for the remaining resources in the first ledger; (g) determining, by the second data center, whether said difference exceeds remaining resources of the second data center; (h) in response to determining that the difference does not exceed the remaining resources of the second data center: (1) reserving, by the second data center, the difference from the remaining resources of the second data center; (2) appending, by the second data center, a second reserve entry to a second ledger of the second data center; and (3) notifying, by the second data center, the first data center of the reserved difference; and (i) in response to the time interval expiring without the reserved difference in the second data center being utilized, refunding, by the second data center, the reserved difference to the second data center.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for allocating resources between data centers in response to insufficient resources at one of the data centers, the method comprising:
    in response to a request for resources, determining, by a first data center, whether said resources exceed remaining resources of the first data center;
    in response to determining that the requested resources exceed the remaining resources of the first data center:
        reserving, by the first data center, the remaining resources of the first data center;
        appending, by the first data center, a first reserve entry for the remaining resources to a first ledger of the first data center; and
        submitting, by the first data center, to a second data center, a request to reserve a difference between the resources in the request and the remaining resources of the first data center;
    determining, by the second data center, whether said difference exceeds remaining resources of the second data center;
    in response to determining that the difference does not exceed the remaining resources of the second data center:
        reserving, by the second data center, the difference from the remaining resources of the second data center;
        appending, by the second data center, a second reserve entry to a second ledger of the second data center; and
        notifying, by the second data center, the first data center of the reserved difference; and then
    in response to a time interval expiring without the reserved remaining resources being utilized, releasing, by the first data center, the reserved remaining resources for use in one or more subsequent requests for the resources.

2. The computer-implemented method of claim 1, wherein the first data center and the second data center are part of a processing network.

3. The computer-implemented method of claim 1, further comprising receiving the request for resources as an authorization request for a transaction; and
    wherein the time interval expiring without the reserved remaining resources being utilized includes the transaction failing.

4. The computer-implemented method of claim 3, further comprising notifying the second data center of the release of the reserved remaining resources and/or of the time interval expiring without the reserved remaining resources being utilized.

5. The computer-implemented method of claim 3, further comprising appending a transaction identifier for the transaction to the first reserve entry for the remaining resources in the first ledger.

6. The computer-implemented method of claim 1, further comprising, in response to the time interval expiring without the reserved difference in the second data center being utilized, refunding, by the second data center, the reserved difference to the second data center.

7. The computer-implemented method of claim 1, wherein the resources include an amount of currency.

8. A processing network for allocating resources between data centers in response to insufficient resources at one of the data centers, the processing network comprising:
  a first data center having a first ledger data structure, and a second data center having a second ledger data structure;
  wherein the first data center configured to:
    in response to a request for resources, determine whether said resources exceed remaining resources of the first data center;
    in response to a determination that the requested resources exceed the remaining resources of the first data center:
      reserve the remaining resources of the first data center;
      append a first reserve entry for the remaining resources to the first ledger data structure; and
      submit, to the second data center, a request to reserve a difference between the resources in the request and the remaining resources of the first data center; and
    in response to expiration of a time interval without the reserved remaining resources being utilized, releasing, by the first data center, the reserved remaining resources for use in one or more subsequent requests for the resources; and
  wherein the second data center is configured to:
    determine whether said difference exceeds remaining resources of the second data center; and
    in response to a determination that the difference does not exceed the remaining resources of the second data center:
      reserve the difference from the remaining resources of the second data center;
      append a second reserve entry to a second ledger of the second data center; and
      notify the first data center of the reserved difference.

9. The processing network of claim 8, wherein the first data center is further configured to receive the request for resources as an authorization request for a transaction; and
  wherein the time interval expiring without the reserved remaining resources being utilized includes the transaction failing.

10. The processing network of claim 9, wherein the first data center is further configured to notify the second data center of the release of the reserved remaining resources and/or of the time interval expiring without the reserved remaining resources being utilized.

11. The processing network of claim 9, wherein the first data center is further configured to append a transaction identifier for the transaction to the first reserve entry for the remaining resources in the first ledger.

12. The processing network of claim 8, wherein the second data center is further configured, in response to expiration of the time interval without the reserved difference in the second data center being utilized, refund the reserved difference to the second data center.

13. The processing network of claim 8, wherein the resources include an amount of currency.

* * * * *